(12) United States Patent
Watanabe et al.

(10) Patent No.: US 7,224,796 B2
(45) Date of Patent: *May 29, 2007

(54) PSEUDORANDOM NUMBER GENERATING APPARATUS OR ENCRYPTION OR DECRYPTION APPARATUS USING THE SAME

(75) Inventors: Dai Watanabe, Kamakura (JP); Soichi Furuya, Fujisawa (JP); Kazuo Takaragi, Ebina (JP)

(73) Assignee: Hitachi, Ltd., Tokyo (JP)

( * ) Notice: Subject to any disclaimer, the term of this patent is extended or adjusted under 35 U.S.C. 154(b) by 906 days.

This patent is subject to a terminal disclaimer.

(21) Appl. No.: 10/046,167

(22) Filed: Jan. 16, 2002

(65) Prior Publication Data

US 2002/0097868 A1    Jul. 25, 2002

(30) Foreign Application Priority Data

Jan. 23, 2001    (JP)    ............................ 2001-013959
May 16, 2001   (JP)    ............................ 2001-145783
Sep. 11, 2001   (JP)    ............................ 2001-274433

(51) Int. Cl.
    *H04L 9/00*    (2006.01)
(52) U.S. Cl. ............................ 380/46; 380/28; 380/37; 380/43; 380/44; 380/45; 380/46; 380/47; 380/268
(58) Field of Classification Search ................ 380/44, 380/45, 46, 47, 28, 37, 43, 268
    See application file for complete search history.

(56) References Cited

U.S. PATENT DOCUMENTS 5,454,039 A * 9/1995 Coppersmith et al. ........ 380/28
6,014,445 A * 1/2000 Kohda et al. ................. 380/28
6,252,958 B1 * 6/2001 Rose ............................ 380/28
6,937,727 B2 * 8/2005 Yup et al. ..................... 380/37
6,985,582 B1 * 1/2006 Sano et al. ................... 380/42
7,106,860 B1 * 9/2006 Yu et al. ....................... 380/37

OTHER PUBLICATIONS

Daemen et al. Fast Hashing and Stream Encryption with PANAMA, PFS'98 pp. 60-74.*

J. Daemen and C. Clapp, "Fast Hashing and Stream Encryption with PANAMA," Fast Software Encryption, 5th International Workshop, Proceedings, LNCS1372, 61-74, Springer-Verlag, 1998.

(Continued)

*Primary Examiner*—Kim Vu
*Assistant Examiner*—Beemnet W Dada
(74) *Attorney, Agent, or Firm*—Mattingly, Stanger, Malur & Brundidge, P.C.

(57) ABSTRACT

In a buffer and a state included in a pseudorandom number generating apparatus, the state has the configuration of assuming that the unit length of data processing is n, the state has a size of 3×n bits, and the buffer has a capacity of 32×n bits, and according to clock control, a state transformation section (state transformation function) for conducting a state alteration from time t to time t+1 uses a nonlinear function F (having an n-bit input and an n-bit output) twice, or two different nonlinear functions F and G respectively once. The state transformation section has such a configuration that a nonlinear function such as a round function of a block cipher sufficiently evaluated as to the cryptographic security and implementation.

2 Claims, 13 Drawing Sheets

OTHER PUBLICATIONS

B. Schneier, "Applied Cryptography," John Wiley & Sons, Inc., 1996, pp. 369-428.

B. Schneier and D. Whiting, "Fast Software Encryption: Designing Encryption Algorithms for Optimal Software Speed on the Intel Pentium Processor," Fast Software Encryption, 4th International Workshop, FSE'97, Haifa, Israel, Jan. 1997, Proceedings, Lecture Notes in Computer Science, vol. 1267, Springer-Verlag, pp. 242-259, 1998.

J. Daemen and V. Rijmen, "AES Proposal: Rijndael," The first AES Candidate Conference.

R. Anderson, et al "Tiger: A Fast New Hash Function", Fast Software Encryption, Lecture notes in Computer Science, vol. 1039, pp. 89-93, Dec. 1995.

* cited by examiner

PSEUDORANDOM NUMBER GENERATING APPARATUS OR ENCRYPTION OR DECRYPTION APPARATUS USING THE SAME

BACKGROUND OF THE INVENTION

The present invention relates to a technique for generating a practical random number sequence and its application technique.

In signature generation utilizing a public key cryptosystem, generation of a key in conducting secret communication, and a stream cipher technique, a random number sequence is highly needed. However, it is impracticable to attempt to use a truly random number sequence in these situations. In practice, there is used a pseudorandom number (hereafter simply referred to as random number) generated by a pseudorandom number generating method or an apparatus using the pseudorandom number generating method. As conditions required of the pseudorandom number as regards use in cryptograph, there are properties concerning the security, such as that the pseudorandom number is unpredictable and the initial value for determining the random number cannot be derived. In addition, in order that the pseudorandom number generating method or the pseudorandom number generating apparatus may withstand the practical use, high speed processing is demanded in software implementation or hardware implementation. In addition, the pseudorandom number generating method or the pseudorandom number generating apparatus needs to be efficient from the aspect of the implementation cost as well. For example, the number of gates required in the case of hardware implementation, and the number of steps and required memory region at the time of execution in the case of software implementation need to be small. As a general purpose cryptographic algorithm, an algorithm having no drawbacks in all of these evaluation items is desirable.

Many of currently known algorithms are suitable for either software or hardware in the aspect of performance or implementation.

For example, in the case of an algorithm especially suitable for software implementation, the circuit scale becomes large because the situation at the time of hardware implementation has not been considered.

As an example using an algorithm suitable for hardware processing, there is a pseudorandom number generating apparatus based on a linear feedback shift register (LFSR) that is small in hardware implementation scale and that is capable of realizing high speed processing as well. However, this is not sufficient in processing speed in the case where software implementation is conducted.

As such a pseudorandom number generating method that practical implementation is possible in both software and hardware, the OFB mode and the counter mode, which utilize the block cipher technique are known. However, their random number generating speed is the same as the processing speed of the block cipher. In general, the processing speed is not sufficient as compared with dedicated pseudorandom number generating apparatuses.

As the application field of the cryptographic technique spreads, there is desired a pseudorandom number generating technique that satisfies the above-described conditions in both hardware and software and that has a degree of freedom and flexibility enough to put it to practical use.

Furthermore, a pseudorandom number generating technique having high security is demanded.

SUMMARY OF THE INVENTION

The present invention provides such a pseudorandom generating method, or apparatus, that the security is high, high speed processing is possible in software as well, and implementation of high speed and small circuit scale is possible in hardware as well.

The present invention further provides an encryption apparatus or decryption apparatus using the above-described pseudorandom generating technique.

In accordance with one aspect, the present invention provides the following configuration of a state, which is included in a buffer (a large memory region) and a state (a smaller memory region) of a pseudorandom number generating apparatus for executing an algorithm disclosed in the reference 1:

(i) assuming that the unit length of data processing is n (for example, such as 32, 64, 128, or 256 bits), the state has a size of 3 or more (preferably 3)×n bits; and (ii) according to clock control, a state transformation section (state transformation function) for conducting a state alteration from time t to time t+1 uses a nonlinear function F (having an n-bit input and an n-bit output) twice or two different nonlinear functions F and G respectively once.

In accordance with another aspect, a pseudorandom number generating apparatus according to the present invention includes: a state storage section; a buffer; a state transformation section for conducting transformation using a storage content of the buffer and a storage content of the state storage section and outputting a result of the transformation; a state storage control section for updating an internal state of the state storage section by using the output of the state transformation section according to a clock; and a buffer control section for updating an internal state of the buffer by using the output of the buffer transformation section, and the state storage section has a capacity of 3 blocks (where one block has n bits), the buffer has a capacity of a plurality of blocks, and the state transformation section includes: a nonlinear transformation section that uses the storage content of the buffer and the storage content of the state storage section as inputs; and an output section for outputting one block data included in the result of the transformation as a partial random number sequence.

The above described configuration may be implemented by a program on a computer including a storage device and a processor. Internal states of the state storage section and the buffer section are updated at predetermined steps of the program.

Furthermore, the state transformation section includes a first operation section and a second operation section, the first operation section includes: an input section for accepting 1st and 2nd blocks included in three blocks stored in the state storage section, and a block stored in the buffer, as inputs thereof; a first nonlinear transformation section for conducting nonlinear transformation on the 1st block and the block stored in the buffer and outputting n-bit data; a third operation section for receiving an output of the first nonlinear transformation section and the 2nd block as inputs thereof and conducting a logical operation on the inputs; and an output section for outputting the 1st block and a result of the operation conducted by the third operation section, and the second operation section includes: an input section for accepting either output of the first operation section, a 3rd block stored in the state storage section, and the block stored in the buffer, as inputs thereof; a second nonlinear transformation section for conducting nonlinear transformation on either output of the first operation section and the block stored in the buffer and outputting n-bit data; a fourth operation section for receiving an output of the second nonlinear transformation section and the 3rd block as inputs thereof and conducting a logical operation on the inputs; and an output section for outputting either output of the first operation section and a result of the operation conducted by the fourth operation section.

In addition, the state transformation section further includes a permutation section for conducting permutation so that operation results of the third and fourth operation sections will be stored in the state storage section as blocks different from blocks respectively input to the third and fourth operation sections.

In the above-described configuration, parallel processing is made possible by setting the size of the state equal to at least 3 blocks by n bits. In addition, by setting the size of the state equal to 3 blocks by n bits, it becomes possible to make the circuit scale small at the time of hardware implementation. In other words, the above-described configuration makes it possible to implement a pseudorandom number generating apparatus having the following advantages:

(a) higher security can be ensured though security evaluation is simple;

(b) the speed in software implementation and hardware implementation is high; and (c) the required memory region and the number of gates in hardware implementation are small, and the implementation cost is low.

These and other benefits are described throughout the present specification. A further understanding of the nature and advantages of the invention may be realized by reference to the remaining portions of the specification and the attached drawings.

(Description of Terms)

Pseudorandom number generating apparatus: an apparatus that is supplied with an initial value for determining a random number sequence and that generates a pseudorandom number sequence Pseudorandom number: a finite or infinite bit sequence that cannot be discriminated from a truly random number sequence Symmetric-key encryption: encryption technique using the same key in encryption and decryption Key: secret parameter used in encryption Plaintext: data before encryption or after decryption. It includes digitized multimedia data as well.

Ciphertext: encrypted data.

Block cipher: cryptographic technique of conducting encryption or decryption by partitioning input data at intervals of data of a predetermined length (partitioned data of a predetermined length is referred to as block) and conducting agitation together with a key.

Stream cipher: cryptographic technique of generating a ciphertext by giving information that determines a random number sequence to a pseudorandom number generating apparatus, thereby generating a random number sequence, and agitating the random number sequence and the plaintext.

Nonlinear transformation: state transition functions that are not linear transformation.

S-box: a substitution table of approximately 3 to 10 bits. Since transformation having high nonlinearity and agitation property can be conducted by referring to the table and implementation using a simple configuration is possible, the S-box is used frequently in cryptograph implementation.

Maximum separable distance code (MDS) matrix: It is linear transformation, and it is such a matrix that a minimum value (the number of branches) of the sum of elements of input and output data that become non-zero is maximized. It is known that an n by n MDS matrix is n+1 in number of branches.

DETAILED DESCRIPTION OF THE EMBODIMENTS

The disclosures of all articles and references, including patent documents, mentioned in this application are incorporated herein by reference for all purposes.

The algorithm suitable for software processing as described above is disclosed in the following references.

Reference 1: J. Daemen and C. Clapp, "Fast Hashing and Stream Encryption with PANAMA," Fast Software Encryption, 5th International Workshop, Proceedings, LNCS1372, 61–74, Springer-Verlag, 1998.

Reference 2: U.S. Pat. No. 5,454,039

A pseudorandom number generating apparatus is disclosed in, for example, the following reference.

Reference 3: B. Schneier, "Applied Cryptography," John Wiley & Sons, Inc., 1996, pp. 369–428.

The techniques utilizing the block cipher technique is described in the reference 3, pp. 203–206. And their processing speed can be evaluated from the processing speed of the cipher described in the reference 2 and the following reference 4.

Reference 4: B. Schneier and D. Whiting, "Fast Software Encryption: Designing Encryption Algorithms for Optimal Software Speed on the Intel Pentium Processor," Fast Software Encryption, 4th International Workshop, FSE'97, Haifa, Israel, January 1997, Proceedings, Lecture Notes in Computer Science, Vol. 1267, Springer-Verlag, pp. 242–259, 1998.

An embodiment of the present invention will now be described by referring to drawing. Notation "XOR" used in description of each drawing represents exclusive OR taken bit by bit.

Figure 2:
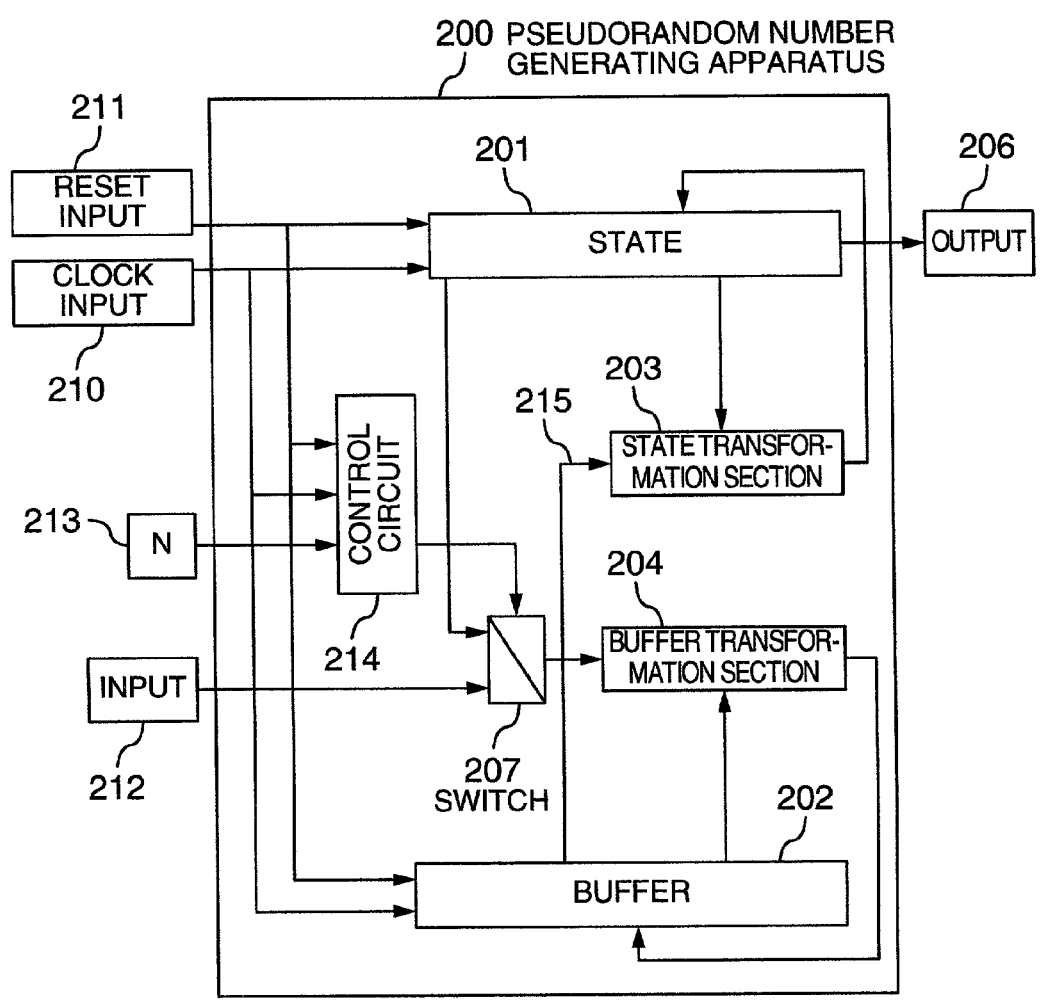
FIG. 2 is a schematic configuration diagram of the pseudorandom number generating apparatus in the embodiment.

As shown in FIG. 2, a random number generating apparatus (200) of the present embodiment includes a state storage section (hereafter referred to as state) (201) having a storage area of 64 bits by 3 blocks where one block has 64 bits, a buffer (202) having a storage area of 64 bits by 32 blocks, a state transformation section (203) for updating the internal state of the state (201), a buffer transformation section (204) for updating contents of the buffer, a switch (207) for switching the buffer input, and a control section (214) for controlling the switch.

From the viewpoint of the digital circuit or program structure, it is desirable to use a multiple of 32 as the unit of processing. From the viewpoint of criptographic security, it is desired that the number of internal states of the state and the buffer is large. In the present preferred embodiment, one block serving as the unit of processing is set equal to 64 bits. The size of the state is set equal to 3 blocks, and the size of the buffer is set equal to 32 blocks. As a result, it becomes possible to parallelize the processing and make the circuit scale small.

Upon receiving a clock signal (210) serving as a trigger in the case where the present embodiment is configured by using hardware, the state (201) stores a value of the state transformation section (203) as a new state value. Upon receiving the clock signal (210), the buffer also stores a value of the buffer transformation section (204) as a new value in the same way. Upon receiving the clock signal (210), the control circuit (214) counts by using its internal counter. According to the value of the internal counter, the switch (207) conducts switchover to select either an input (212) or an output of the state (201). The buffer transformation section (204) determines a new content of the buffer (202) on the basis of the input value (64 bits) determined according to the switchover of the switch (207) and the current value of the buffer.

Figure 5:
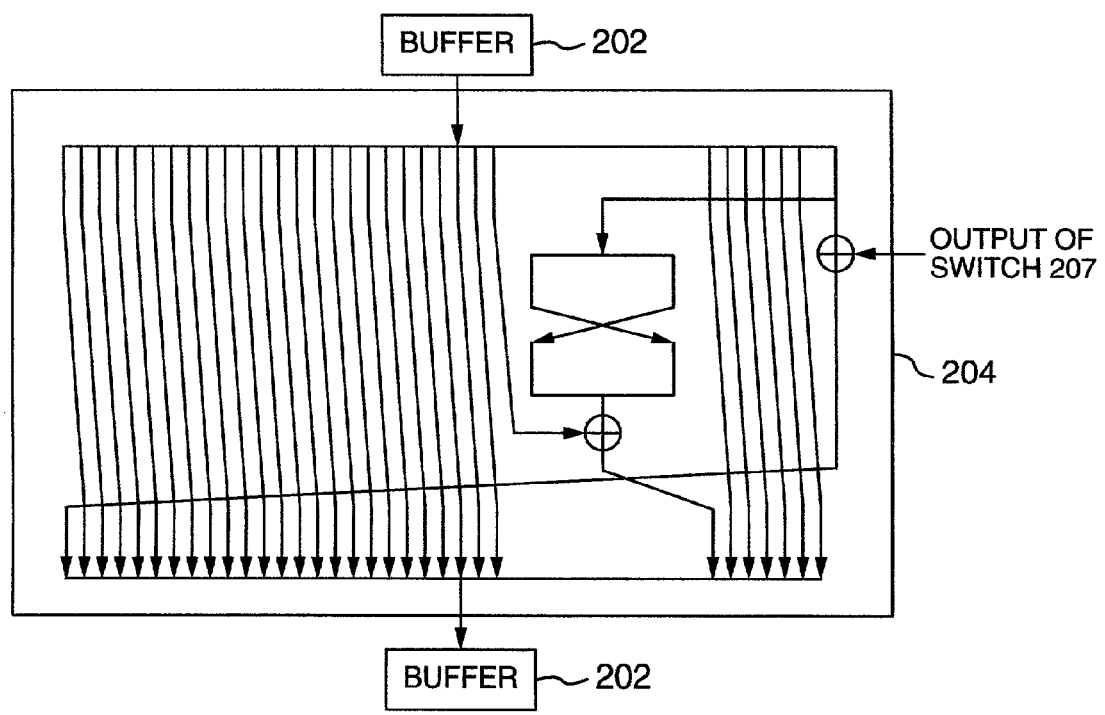
FIG. 5 is a schematic diagram showing a configuration of a buffer transformation section of the pseudorandom number generating apparatus in the embodiment.

FIG. 5 illustrates a configuration of the buffer transformation section (204) of FIG. 2 in more detail.

The buffer transformation section (204) outputs blocks included in 32 blocks input from the buffer (202) except a 25th high-order block and a 32nd high-order block, as blocks lowered in order by one. Furthermore, the 25th block, and the 32nd block with its high-order bits and its low-order bits interchanged are subject to an exclusive OR-ing operation, and its result is output as a block lowered in order by one. Furthermore, the 32nd block and an output of the switch (207) are subject to an exclusive OR-ing operation, and its result is output as a 1st block.

Operation of FIG. 2 will now be described by referring to a flow chart of FIG. 1.

Figure 1:
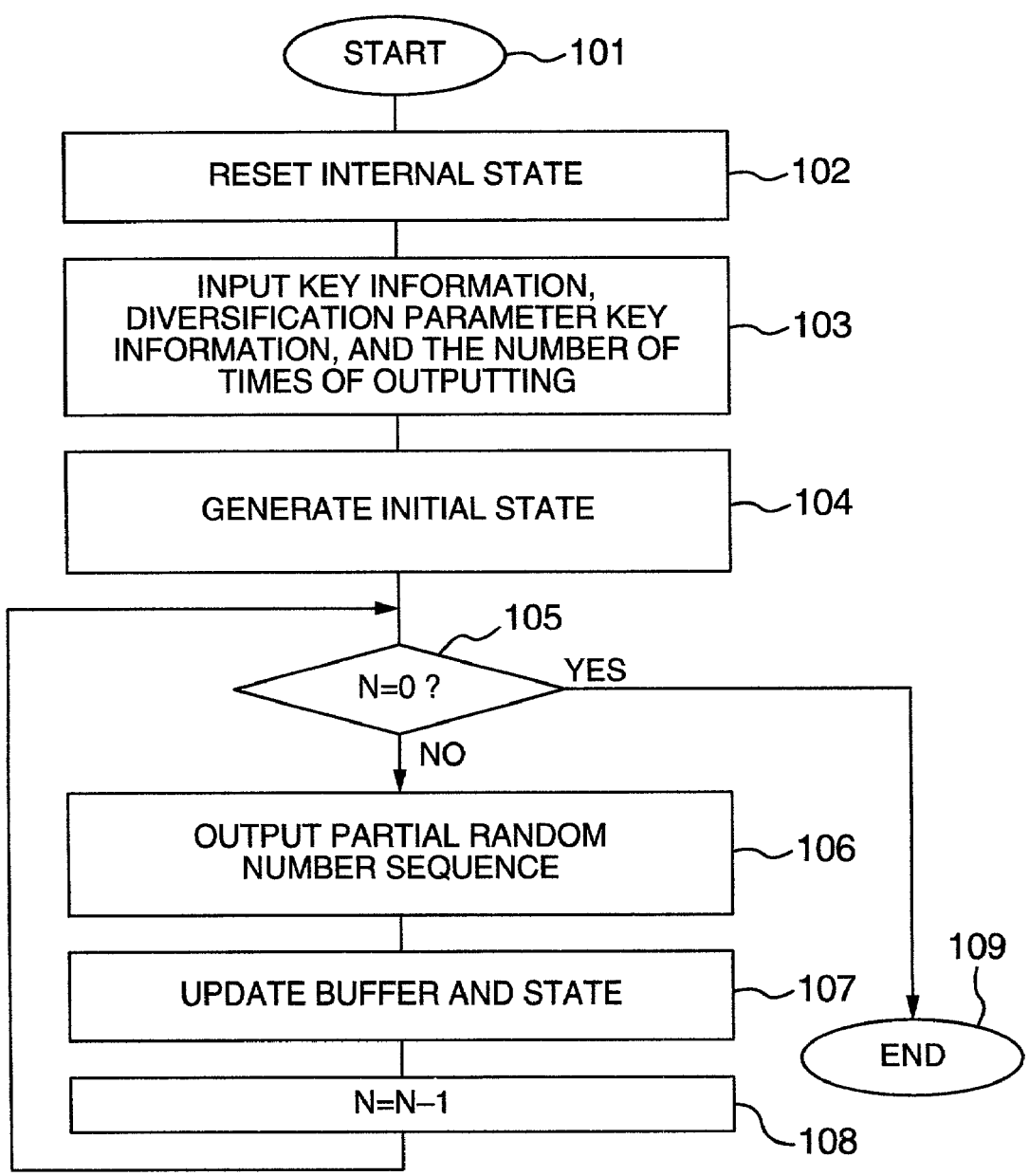
FIG. 1 is a flow chart showing a processing procedure of a pseudorandom number generating device in an embodiment.

In the present embodiment, the random number generating apparatus (200) performs processing steps 102 to 108 shown in FIG. 1. Furthermore, the random number generating apparatus (200) generates a bit sequence (a partial random number sequence) of 64 bits every clock.

At steps 102 to 104, set up for internal state initialization and random number generation is conducted.

Step 102: The contents of the state (201) and the buffer (202), and an internal memory in the control circuit (214) are reset by a reset input (211). For example, all bit values are set equal to 0.

Step 103: As information for determining the random number sequence, key information and a diversification parameter are input (212). With key information of 64 high-order bits supplied to the input, the clock signal (210) is input. Subsequently, with key information of 64 low-order bits supplied to the input, the clock signal (210) is input. Subsequently, in the same way, the diversification parameter is also divided into 64 high-order bits and 64 low-order bits, and they are input by two clock pulses. In the clock processing, the buffer (202) and the state (201) operate as described above. In addition, a number of times of outputting (213) is input. In the present embodiment, each of the key information and the diversification parameter for determining a diversification parameter to be generated, and the number of times of outputting is set to a numerical value in 128 bits.

Step 104: In order to generate an initial state, 128 clock processings are conducted to agitate the contents of the buffer (202) and the state (201). The control circuit (214) exercises control so that the switch (207) will select the state output in the step 104 and subsequent steps. In the present embodiment, for example, 64 high-order bits aH of the state output are input to the switch (207).

In subsequent steps, a partial random number is repetitively generated.

Step 105: If N=0, then the processing is finished (step 109). Otherwise, the processing proceeds to step 106.

Step 106: The state transformation section conducts transformation processing and outputs a partial random number sequence of 64 bits.

Step 107: A result of transformation processing conducted by the clock signal, the state transformation section (203) and the buffer transformation section (202) is supplied to the buffer and the state, and the content is updated.

Step 108: N=N−1 is carried out, and the processing returns to the step 105.

One or more partial random number sequences generated by repetition of the steps 105 to 108 are subject to, for example, bit coupling. As a result, a desired pseudorandom number sequence is obtained.

In the case where the configuration of the present embodiment is implemented by software processing, a series of operations ranging from the step 105 to the step 108 for obtaining one partial random number sequence is referred to as round.

Figure 11:
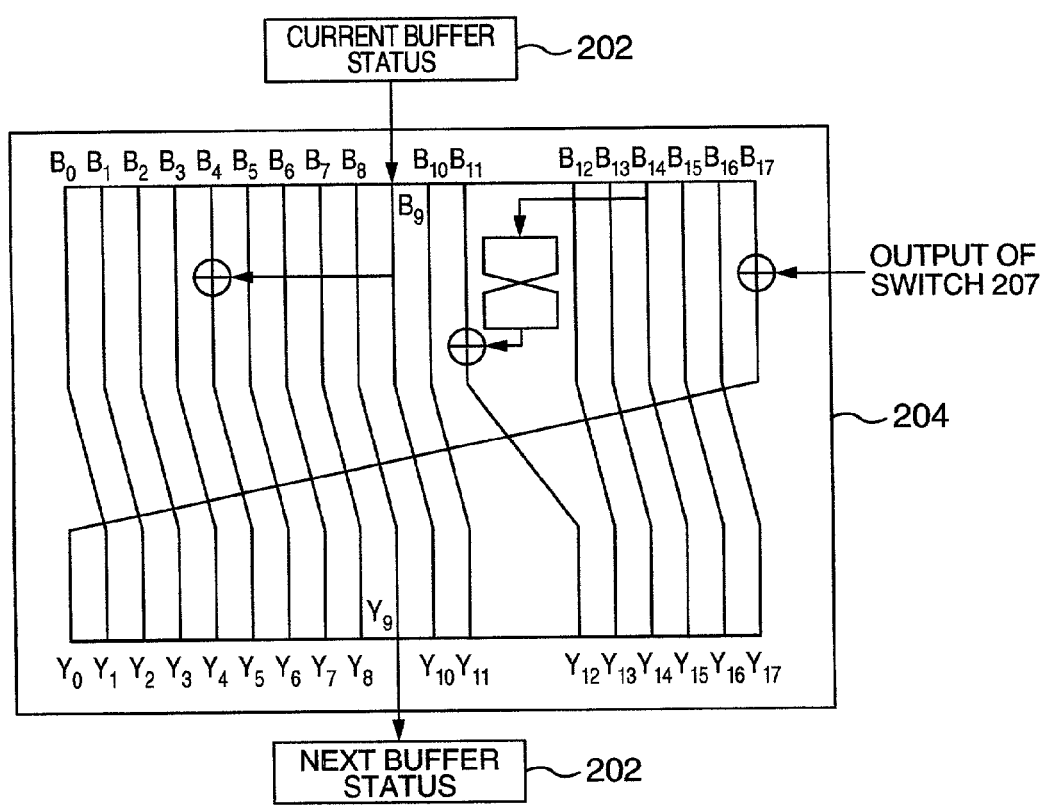
FIG. 11 is a schematic diagram showing another configuration of the buffer transformation section.

FIG. 11 illustrates another configuration of the buffer transformation section (204). At this time, the storage region of the cooperating buffer (202) has a configuration of 64 bits by 18 blocks.

The buffer transformation section (204) outputs blocks included in 18 blocks input from the buffer (202) except a 2nd high-order block, a 12th high-order block and an 18th high-order block, as blocks lowered in order by one. Furthermore, the 2nd high-order block and a 7th high-order block are subject to an exclusive OR-ing operation, and its result is output as the 3rd block. Furthermore, a 15th block with its high-order half block and its low-order half block interchanged, and the 12th block are subject to an exclusive OR-ing operation, and its result is output as a 13th block.

Furthermore, the 18th block and the output of the switch (207) are subject to an exclusive OR-ing operation, and its result is output as the 1st block.

In the configuration of the buffer transformation section exemplified in FIG. 11, transformation becomes more complicated and the inside of the buffer can be agitated more intensely as compared with the configuration of FIG. 5. This results in an effect that the cryptographic strength is increased.

Figure 12:
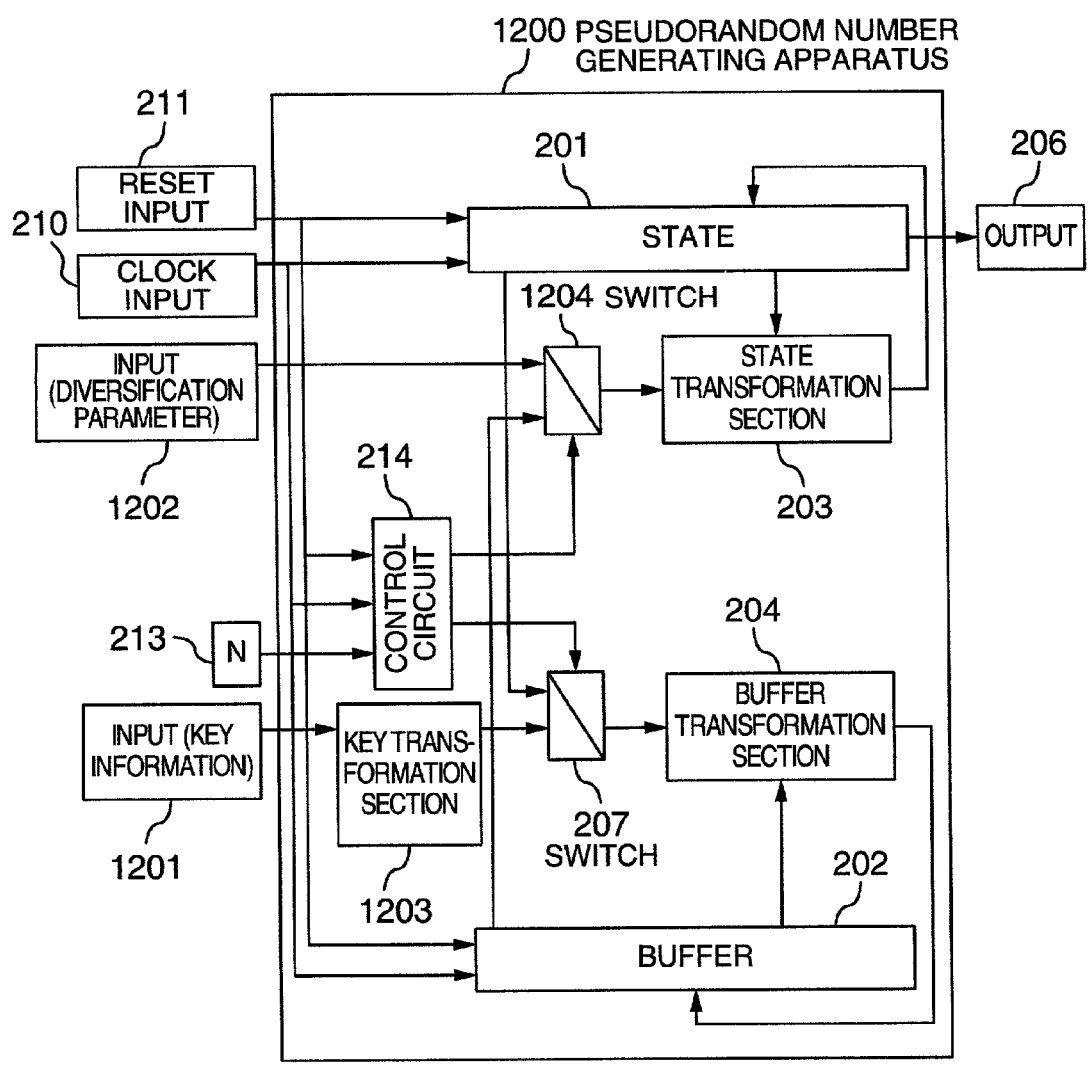
FIG. 12 is a schematic configuration diagram of a pseudorandom number generating apparatus formed by using the buffer transformation section shown in FIG.

FIG. 12 illustrates a configuration of the random number generating apparatus in the case where the buffer transformation section of FIG. 11 is used. Operations of the steps 103 and 104 in the flow chart of FIG. 1 conducted in the configuration of FIG. 12 will now be described.

Step 103: As a secret parameter, key information (1201) is input. As a public parameter, an initial vector or diversification parameter (1202) is input. In the present embodiment, each of the key information and initial vector or diversification parameter has 128 bits (2 blocks). In the state (201), the initial vector or diversification parameter of 128 bits is input to two low-order blocks.

Step 104: An initial state is generated.

Key information transformed by a key transformation section is input to the buffer. The key transformation section conducts transformation as follows.

$K_H \| K_L$ = key information (128 bits)

$Y_{2I} \leftarrow K_L >>> 7I (0 \leq I < 9)$ $Y_{2I+1} \leftarrow K_H <<< 7(I+1)(0 \leq I < 9)$ An output of the key transformation section is input to the buffer in the order of descending order.

$B_0 \| B_1 \| \ldots \| B_{17}$ = buffer value (64 bits by 18 blocks)

$BI \leftarrow YI (0 \leq I \leq 18)$

In the present embodiment, for example, a round function of a block cipher can be used as the state transformation section (203) (see reference 5). The round function of the block cipher cannot sufficiently agitate the internal state when the round function is used individually.

By dynamically updating the internal state of the buffer by using the buffer transformation section (204), providing enough agitation, it is possible to retain security of at least the same degree as the block cipher. A pseudorandom number generating apparatus implemented as described above can be regarded as a mode of the block cipher.

Figure 13:
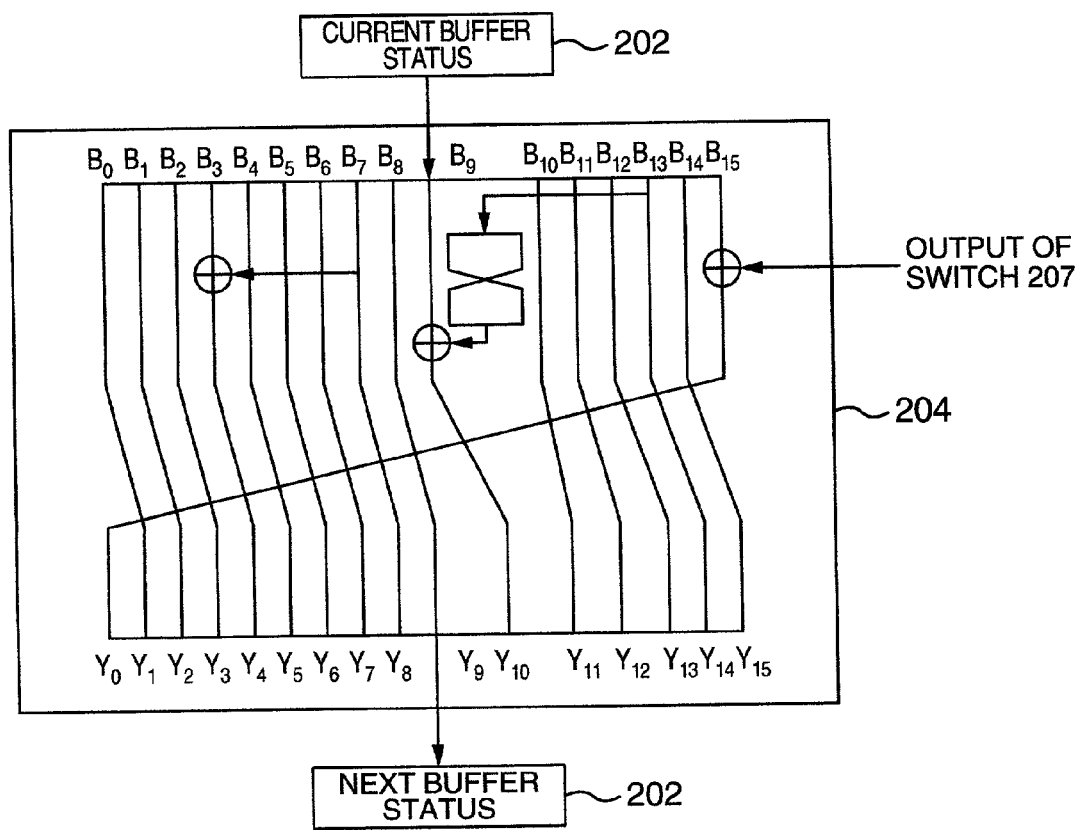
FIG. 13 is a schematic diagram showing another configuration of the buffer transformation section.

FIG. 13 illustrates another configuration of the buffer transformation section (204) in more detail. It is assumed at this time that a storage region of the cooperating buffer (202) has a configuration of 64 bits by 16 blocks.

The buffer transformation section (204) outputs blocks included in 16 blocks input from the buffer (202) except 4th, 10th, and 16th high-order blocks (i.e., $B_3$, $B_9$, and $B_{15}$), as blocks lowered in order by one. Furthermore, the 4th block and an 8th block are subject to an exclusive OR-ing operation, and its result is output as a 5th block (i.e., $Y_4$). Furthermore, a 14th block ($B_{13}$) with its high-order half block and its low-order half block interchanged, and the 10th block ($B_9$) are subject to an exclusive OR-ing operation, and its result is output as an 11th block ($Y_{10}$). Furthermore, the 16th block and an output of the switch (207) are subject to an exclusive OR-ing operation, and its result is output as a 1st block ($Y_0$).

In the configuration exemplified in FIG. 13, the number of blocks is a power of 2. In the case where the buffer transformation section is implemented by using software, therefore, the configuration has an advantage that the state update can be conducted at high speed.

Figure 14:
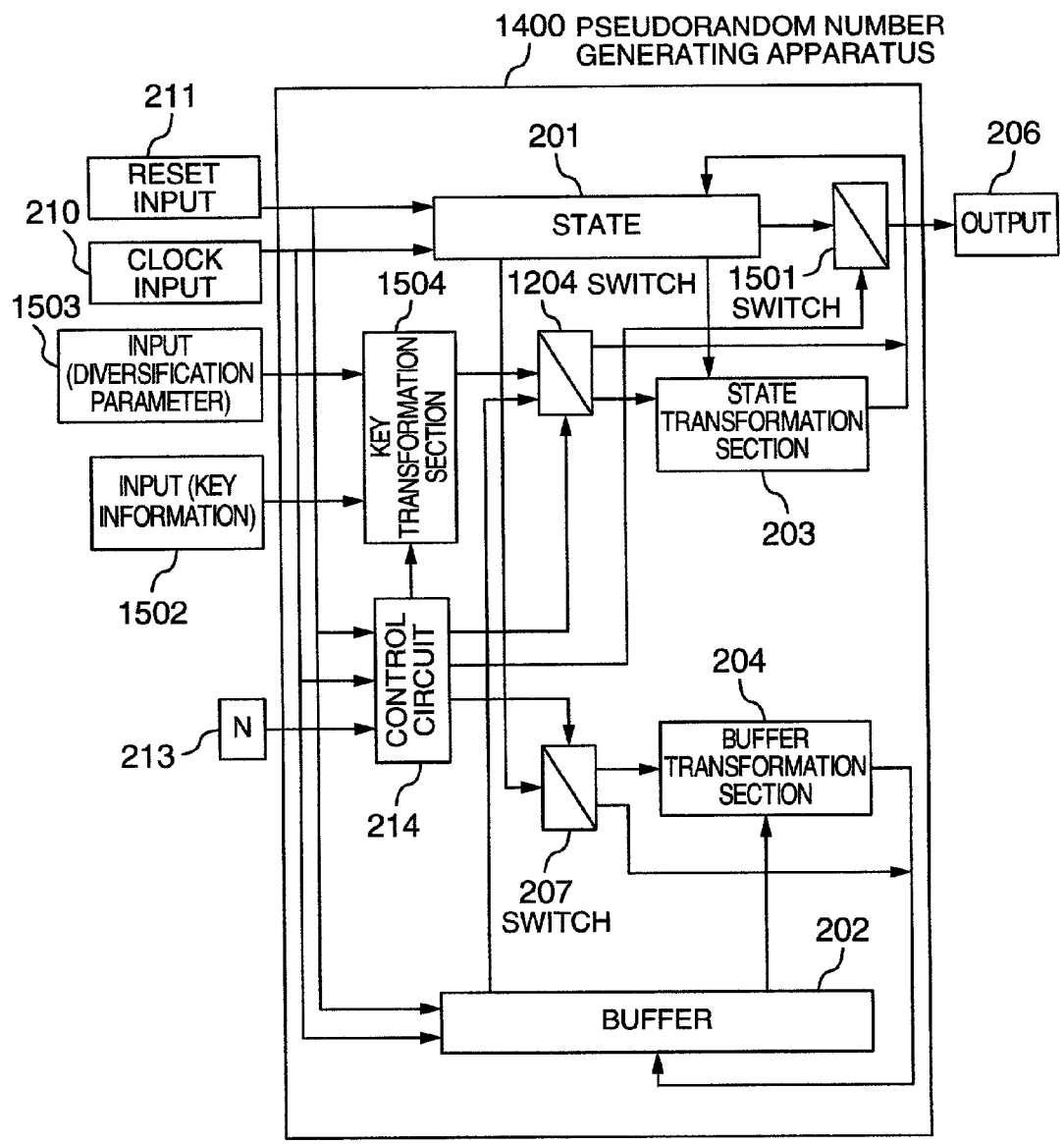
FIG. 14 is a schematic configuration diagram of a pseudorandom number generating apparatus formed by using the buffer transformation section shown in FIG. 13.
Figure 15:
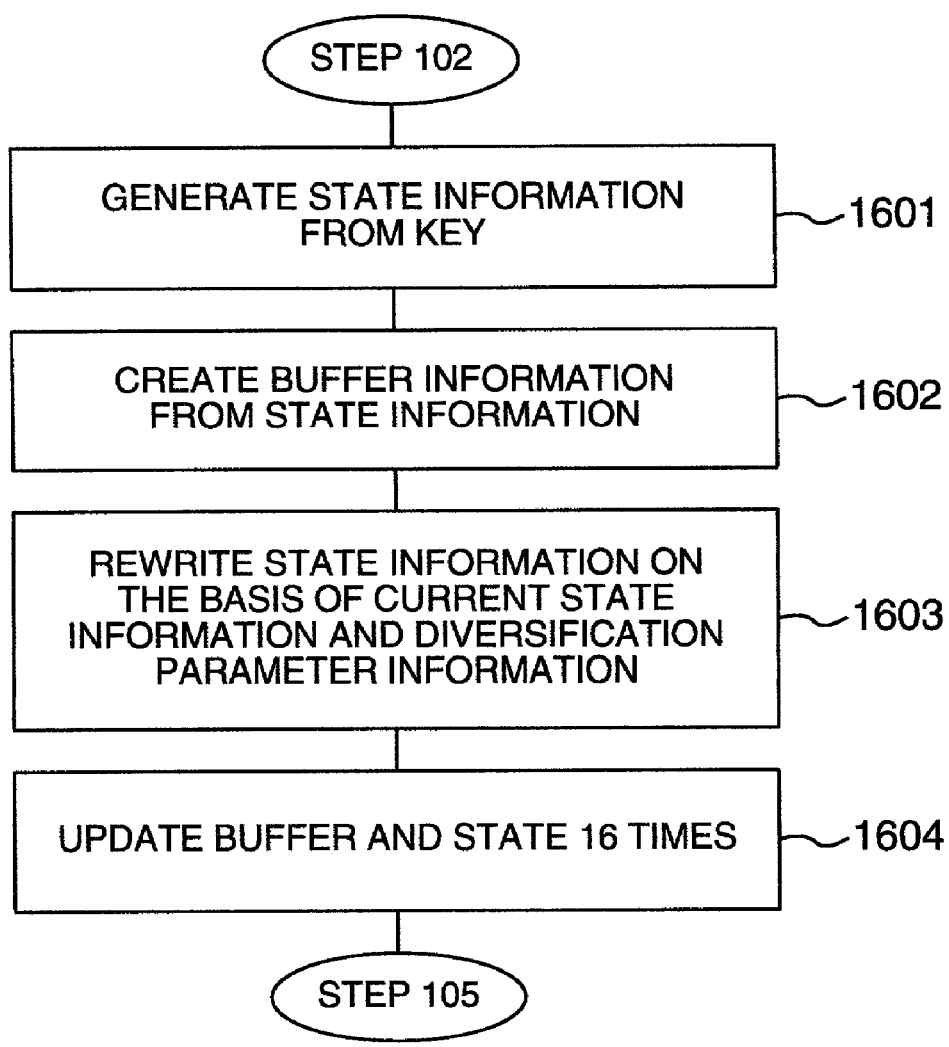
FIG. 15 is a flow chart showing operation of initialization executed by the pseudorandom number generating apparatus of FIG. 14.

FIG. 14 illustrates a configuration of a random number generating apparatus (1400) in the case where the buffer transformation of FIG. 13 is used. Initialization executed by the random number generating apparatus of FIG. 14 and conducted in the flow chart of FIG. 1 will now be described. Steps 1601 to 1604 of FIG. 15 are executed as steps 103 and 104 of the flow chart of FIG. 1.

Step 1601: As a secret parameter, key information (1502) is input to a key transformation section (1504). Key information has 128 bits. Representing key information (1502) by K, a right circular shift with 64 bits taken as the unit by <<< and a left circular shift with 64 bits taken as the unit by >>>, and assuming that C' is a constant of 64 bits, the key transformation section (1504) conducts the following transformation and expands the key information (1502) to data A having the same size as the unit of processing in the state transformation section (192 bits in the present embodiment).

$K_H \| K_L = K$, $A_H \leftarrow K_H$, $A_M \leftarrow K_L$, $A_L \leftarrow (K_H <<< 7) XOR (K_L >>> 7) XOR\ C'$ The expanded data A is input to a state transformation section (203).

Step 1602: Representing an input to the buffer section (202) as $Y_0 \| Y_1 \| \ldots \| Y_{15}$ = buffer value (64 bits by 16 blocks), the data A transformed in the state transformation section (203) i times by $R_i$, and 64-bit sections of $R_i$ by $R_{Hi}$, $R_{Mi}$ and $R_{Li}$ in the descending order, $R_{H1}$ is input to the buffer section (202) in the ascending order and the buffer section retains them.

In other words, it follows that:

$Y_i \leftarrow R_{H(15-i)} (0 \leq i < 16)$

Step 1603: A diversification parameter (1503), which is a public parameter, is input. In the present embodiment, the diversification parameter (1503) has 128 bits. The diversification parameter is expanded to 192 bits in processing conducted in a key transformation section (1504), and input to the state transformation section (203).

$Q_H \| Q_L = Q$ $D_H \leftarrow R_{H16}\ XOR\ Q_H$, $D_M \leftarrow R_{M16}\ XOR\ Q_L$, $D_H \leftarrow R_{L16}\ XOR (Q_H <<< 7) XOR (Q_L >>> 7) XOR\ C'$, $D = D_H \| D_M \| D_L$ Data D obtained by expanding the diversification parameter Q is transformed 16 times in the state transformation section (203). Resultant data is denoted by E. The state section (201) retains E.

Step 1604: The states of the state section and the buffer section supplied with the result of the processing conducted at the steps 1602 and 1603 are updated 16 times.

In other words, the buffer section and the state section are supplied with a clock signal and results of transformation conducted in the state transformation section (203) and the buffer transformation section (202), and contents of them are updated.

According to the initialization method of the present embodiment, it becomes easy to grasp the data flow in the initialization stage. Therefore, it becomes possible to conduct the security evaluation sufficiently.

Figure 3:
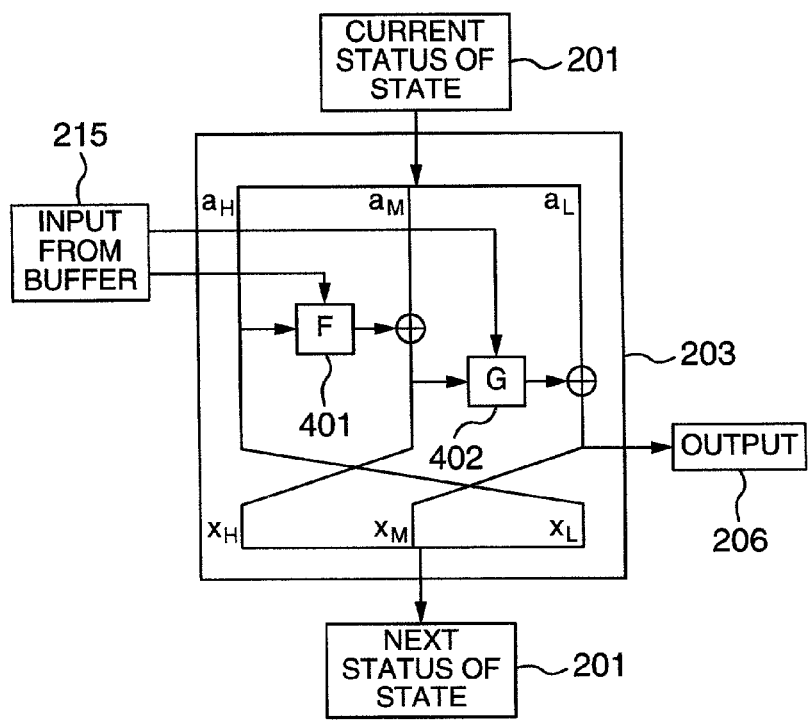
FIG. 3 is a schematic diagram showing a configuration of a state transformation section of the pseudorandom number generating apparatus in the embodiment.
Figure 4:
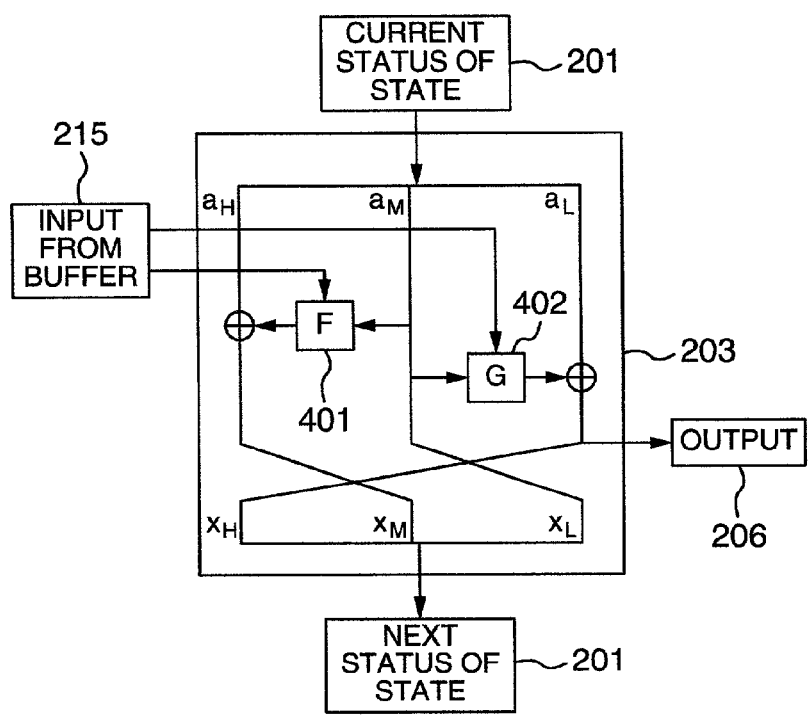
FIG. 4 is a schematic diagram showing another configuration of the state transformation section.

FIGS. 3 and 4 are diagrams showing embodiments of an operation section and a permutation section of a nonlinear state transformation section (203) in the above-described embodiments.

In the configuration of FIG. 3, transformation of the state (201) is conducted as hereafter described. In the algorithm hereafter described, an arrow ← represents substitution of data and ∥ represents concatenation.

The value of the state (201) is loaded.

ti $a_H \| a_M \| a_L$ =state value (192 bits)

$x_L \leftarrow a_H$;

$x_H \leftarrow a_M$ XOR $F(a_H, b_i)$ $x_M \leftarrow a_L$ XOR $G(x_H, b_j)(i \neq j)$ As a partial random number sequence, $x_M$ is output. As the next state value, $x_H \| x_M \| x_L$ is output.

By using this structure, an input to a G function (402) at a certain clock t (or a certain round) becomes the same as an input to an F function (401) at a clock t+1 (or the next round). Accordingly, parallelization of processing becomes possible.

The partial state value $a_L$ at a certain clock t and an output of a G function (402) are subjected to an exclusive OR-ing operation, and then subjected to an exclusive OR-ing operation together with an output of an F function (401) at a clock t+1. Therefore, it is desired that the F function (401) and the G function (402) are functions that conduct mutually different transformations.

FIG. 4 is a diagram exemplifying another configuration of the state transformation section (203). In the configuration of FIG. 4, transformation of the state (201) is conducted as described below.

The value of the state (201) is loaded.

$a_H \| a_M \| a_L$ =state value (192 bits)

$x_L \leftarrow a_M$ $x_M \leftarrow a_H$ XOR $F(a_M, b_i)$ $x_H \leftarrow a_L$ XOR $G(a_M, b_j)(i \neq j)$ As a partial random number sequence, $X_H$ is output. As the next state value, $x_H \| x_M \| x_L$ is output.

By using this structure shown in FIG. 4, an input to an F function (401) at a certain clock t (or a certain round) becomes the same as an input to a G function (402) at the clock t. Accordingly, parallelization of processing becomes possible.

Figure 9:
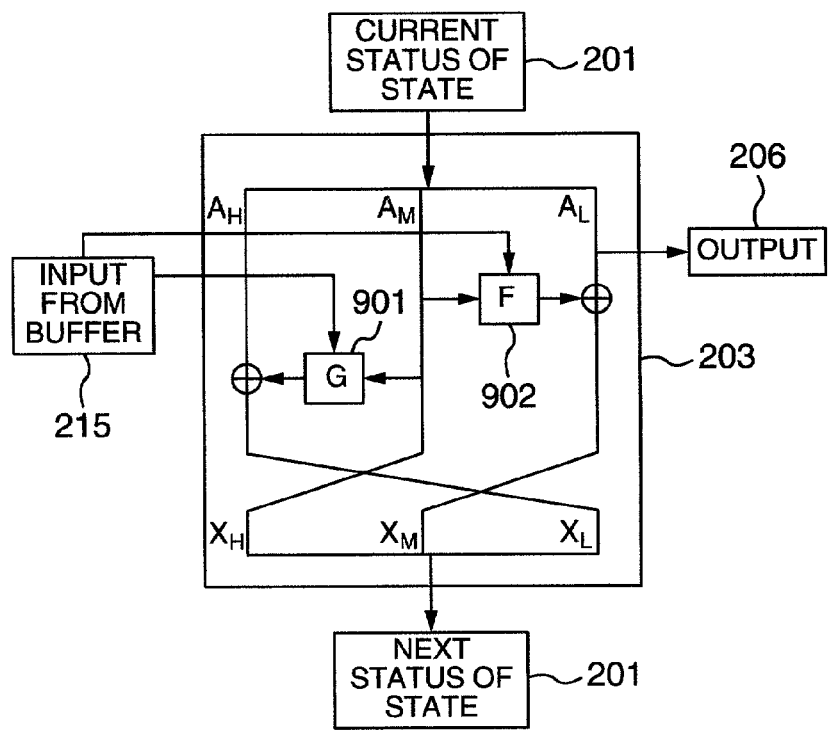
FIG. 9 is a schematic diagram showing still another configuration of the state transformation section.

FIG. 9 is a diagram exemplifying another configuration of the state transformation section (203). In the configuration of FIG. 9, transformation of the state (201) is conducted as described below.

The value of the state (201) is loaded.

$A_H \| A_M \| A_L$ =state value (192 bits)

$X_H \leftarrow A_M$ $X_M \leftarrow A_L$ XOR $F(A_M, B_I)$ $X_L \leftarrow A_H$ XOR $G(A_M, B_J)(I \neq J)$ In each round, $A_H$ is output as a partial random number sequence. As the next state value, $X_H \| X_M \| X_L$ is output.

By using this structure shown in FIG. 9, a round during which data do not change disclosed as the output example is short. Accordingly, the security is improved.

In FIGS. 3 and 4, an input (215) from the buffer supplied to the F function and the G function can be arbitrarily selected. For example, although not illustrated in FIG. 6, a 5th block and a 17th block can be selected.

A permutation method other than the structures shown in FIGS. 3 and 4 may be adopted.

Figure 6:
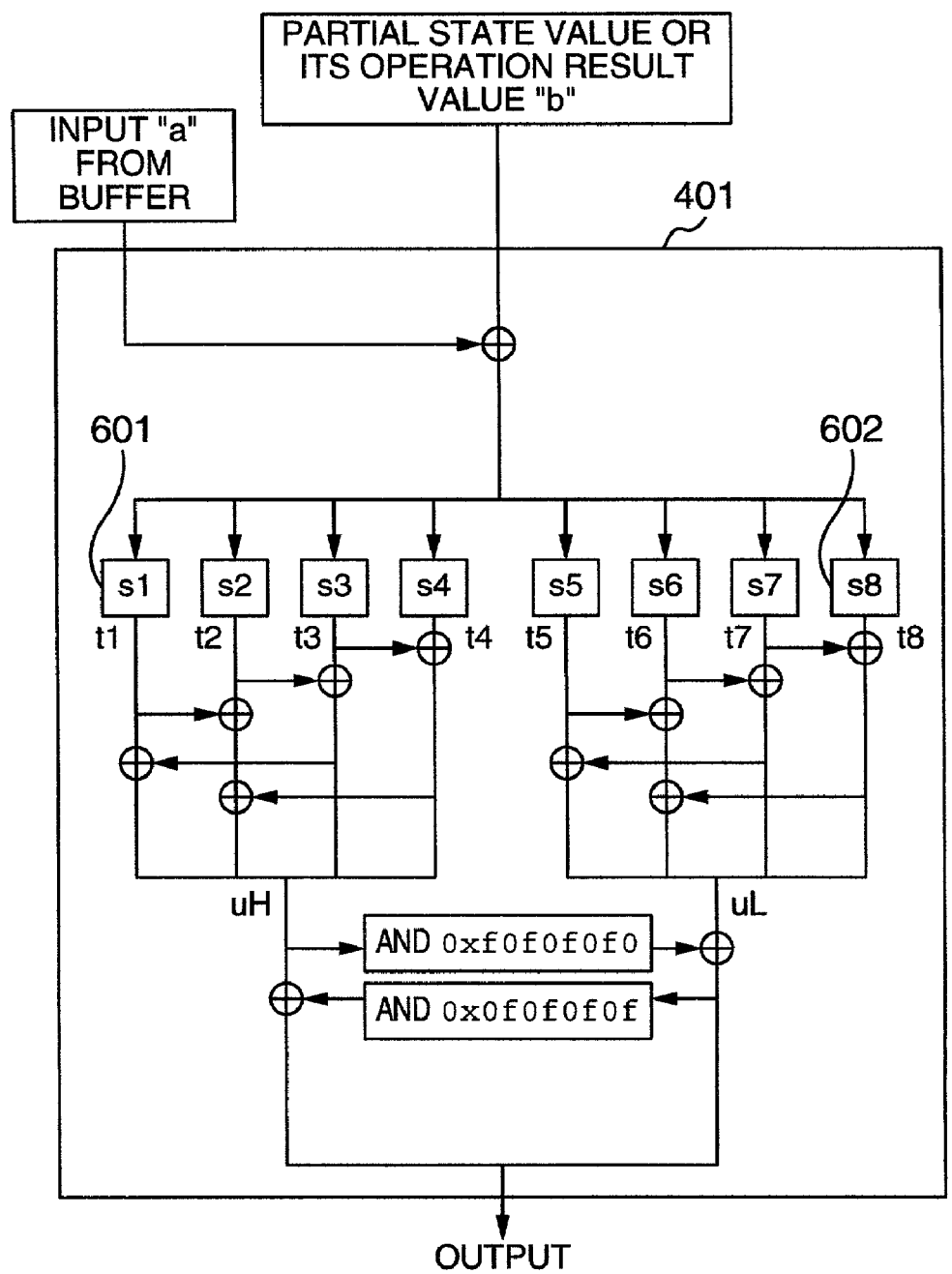
FIG. 6 is a schematic diagram showing a configuration of a nonlinear transformation section used in the state transformation section.

A structure of the F function (or G function) used in FIGS. 3 and 4 is exemplified in FIG. 6.

A result of an exclusive OR-ing operation conducted on two input data is partitioned every 8 bits, and the 8 bits are subjected to nonlinear transformation in S-boxes S1 (601) to S8 (602), respectively. An 8-bit output of the S-boxes S1 (601) to S8 (602) is subjected to transformation processing. An output "out" is thus generated.

As the S-box, for example, the following transformation table used in Rijndael of reference 5: J. Daemen and V. Rijmen, "AES Proposal: Rijndael," The first AES Candidate Conference, available at http://www.esat.kuleuven.ac.be/~rijmen/rijndael/rijndaeldocV2.zip.

S[256]={82, 9, 106, 213, 48, 54, 165, 56, 191, 64, 163, 158, 129, 243, 215, 251, 124, 227, 57, 130, 155, 47, 255, 135, 52, 142, 67, 68, 196, 222, 233, 203, 84, 123, 148, 50, 166, 194, 35, 61, 238, 76, 149, 11, 66, 250, 195, 78, 8, 46, 161, 102, 40, 217, 36, 178, 118, 91, 162, 73, 109, 139, 209, 37, 114, 248, 246, 100, 134, 104, 152, 22, 212, 164, 92, 204, 93, 101, 182, 146, 108, 112, 72, 80, 253, 237, 185, 218, 94, 21, 70, 87, 167, 141, 157, 132, 144, 216, 171, 0, 140, 188, 211, 10, 247, 228, 88, 5, 184, 179, 69, 6, 208, 44, 30, 143, 202, 63, 15, 2, 193, 175, 189, 3, 1, 19, 138, 107, 58, 145, 17, 65, 79, 103, 220, 234, 151, 242, 207, 206, 240, 180, 230, 115, 150, 172, 116, 34, 231, 173, 53, 133, 226, 249, 55, 232, 28, 117, 223, 110, 71, 241, 26, 113, 29, 41, 197, 137, 111, 183, 98, 14, 170, 24, 190, 27, 252, 86, 62, 75, 198, 210, 121, 32, 154, 219, 192, 254, 120, 205, 90, 244, 31, 221, 168, 51, 136, 7, 199, 49, 177, 18, 16, 89, 39, 128, 236, 95, 96, 81, 127, 169, 25, 181, 74, 13, 45, 229, 122, 159, 147, 201, 156, 239, 160, 224, 59, 77, 174, 42, 245, 176, 200, 235, 187, 60, 131, 83, 153, 97, 23, 43, 4, 126, 186, 119, 214, 38, 225, 105, 20, 99, 85, 33, 12, 125};

Denoting the input from the state storage section by "a", the input from the buffer by "b", and the 8-bit outputs of the S-boxes S1 (601) to S8 (602) by t1, t2, t3, t4, t5, t6, t7 and t8, respectively, and assuming that $p=p_1 \| p_2 \| p_3 \| p_4 \| p_5 \| p_6 \| p_7 \| p_8$ ($1 \leq i \leq 8$), the transformation processing shown in FIG. 6 can also be represented as follows.

In the following numerical expressions, a symbol "S(x)" also represents the 8-bit output of the S-boxes Sl (601) to S8 (602). "SHRx" and "SHLX" represent a right shift and a left shift of x bits in the 64-bit width, respectively.

$p \leftarrow a$ XOR $b$;

$ti \leftarrow S[pi](1 \leq i \leq 8)$;

$uH \leftarrow t_1 \| t_2 \| t_3 \| t_4$;

$uL \leftarrow t_5 \| t_6 \| t_7 \| t_8$;

$uX \leftarrow uX$ XOR $SHR8(uX), X=\{L, H\}$;

$uX \leftarrow uX$ XOR $SHL16(uX), X=\{L, H\}$;

uL←uH AND 0xf0f0f0f0;

uH←uL AND 0x0f0f0f0f;

out←uH‖uL;

If in the structure shown in FIG. 4 the F function (401) is made the same function as the G function (402) and there is adopted such a structure that the input (211) from the buffer is subject to an exclusive OR-ing operation after the non-linear transformation, the effect obtained by parallelization is further enhanced.

Capacities of the state and buffer are as small as 3 blocks and 32 blocks, respectively. Therefore, it is possible to reduce the number of clocks (the number of rounds) required for initial setting. In addition, the hardware scale in the case where hardware implementation is conducted can be reduced.

Figure 10:
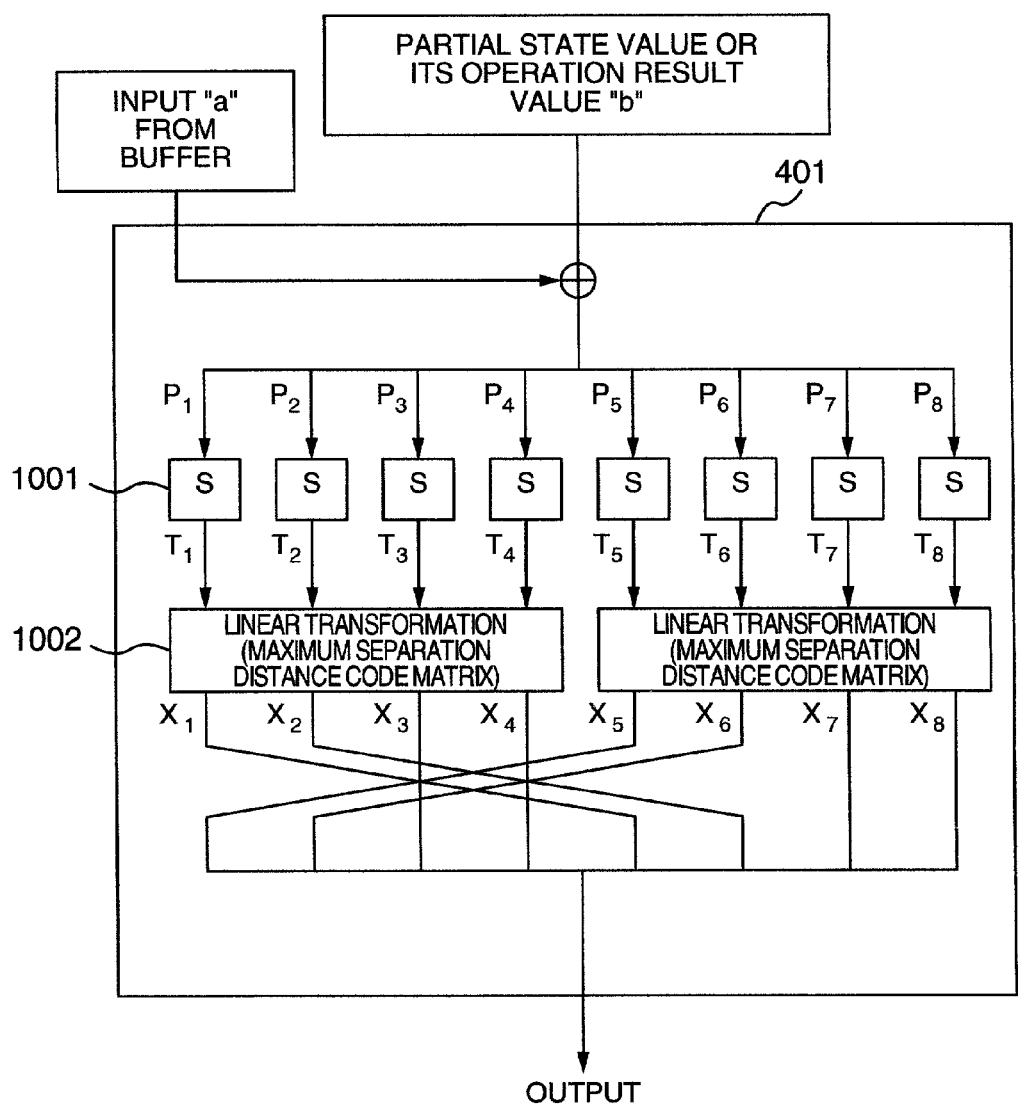
FIG. 10 is a schematic diagram showing another configuration of the nonlinear transformation section.

Another configuration of the F function (401) (or the G function (402)) is shown in FIG. 10.

A result of an exclusive OR-ing operation conducted on two input data is partitioned every 8 bits, and the 8 bits are subjected to nonlinear transformation in S-boxes 1001, respectively. Subsequently, outputs of the S-boxes 1001 are subjected to linear transformation in linear transformation 1002 every 32 bits. In addition, 16 high-order bits of the 32-bit outputs are interchanged. An output "out" is thus generated.

As the S-box, for example, transformation used in the reference 5 can be used. As for the linear transformation of 32 bits as well, one used in the reference 5 can be used.

The linear transformation used in the reference 5 is called maximum distance separation code matrix. It is an example of transformation known as linear transformation that agitates input data and output data most efficiently. The F function thus formed has higher intensity than the F function exemplified in FIG. 6. Accordingly, the number of rounds required for initialization can be reduced. In other words, the number of stages of the buffer (202) can be reduced, and further reduction of the hardware scale can be reduced.

Denoting an input from the state storage section by A, an input from the buffer storage section by B, substitution of data by ←, outputs of the S-boxes by $T_1$, $T_2$, $T_3$, $T_4$, $T_5$, $T_6$, $T_7$ and $T_8$ in the descending order or by S[X], a transformation section using an MDS matrix by MDS ($T_a$, $T_b$, $T_c$, $T_d$), and assuming that $P = P_1 \| P_2 \| P_3 \| P_4 \| P_5 \| P_6 \| P_7 \| P_8$, $(1 \leq I \leq 8)$, transformation processing shown in FIG. 12 can also be represented as follows.

In the following numerical expression, the symbol "S[x]" also represents each 8-bit output of the S-box S (1001).

P←A XOR B;

$T_I \leftarrow S[P_I] (1 \leq I \leq 8)$;

$U_H \leftarrow MDS_1(T_1, T_2, T_3, T_4)$;

$U_L \leftarrow MDS_2(T_5, T_6, T_7, T_8)$;

$U_H X_1 \| X_2 \| X_3 \| X_4$ $U_L = X_5 \| X_6 \| X_7 \| X_8$

OUT←$X_5 \| X_6 \| X_3 \| X_4 \| X_1 \| X_2 \| X_7 \| X_8$;

In addition, an exclusive OR-ing operation with the constant c may also be conducted before outputting the transformation result OUT. As the constant C, different values may also be used in the F function and the G function.

Furthermore, if there is conducted division into blocks while taking 8 bits (one byte) as the unit so that at least one block will differ from other blocks, then it is possible to vary the F function (401), which frequently uses the transformation with a byte taken as the unit, while taking a bit as the unit. For example, representing constants used in the F function and the G function by $C_F$ and $C_G$, respectively, they are set equal to as follows, $C_F$=0xBB67AE85 84CAA73B, $C_G$=0x3C6EF372 FE94F82B where 0xnnnnnnnn represents that the value is represented in hexadecimal notation.

According to the configuration of the present embodiment, not only the nonlinear transformation section having the configuration exemplified above, but also a nonlinear transformation section and round functions of a block cipher evaluated sufficiently as regards the cryptographic security and implementation can be used in the state transformation section. If the unit of processing is set equal to 64 bits as in the present embodiment, then use of the nonlinear transformation section of the block cipher and the round function is further facilitated. Furthermore, a processing speed that is approximately three to five times as fast as the speed of the OFB mode of the block cipher can be anticipated.

In the foregoing description, the processing unit of 64 bits is an example, and it can be altered according to requested specifications.

In the case where the present embodiment is implemented by using software on a typical information processing apparatus including an arithmetic processing unit (processor) and a storage device, the state and buffer are implemented by using registers of the storage device or the arithmetic processing unit, and other components are implemented by execution of programs stored in the storage device conducted by the arithmetic processing unit. Each program is stored previously in the storage device, or loaded from a storage medium into the storage device via an external storage medium reading device included in the information processing device. Or each program may be temporarily downloaded from a network to the storage device via a communication device.

Furthermore, components formed as hardware may be used jointly as some components.

Application Example

One preferred application example of the present embodiment is, for example, a mainstay portion of the network, which needs to conduct an enormous amount of data processing, or a multimedia data processing system, which needs to conduct fast real time processing, Hereafter, data encryption and a discovery system utilizing the present embodiment will be described.

Figure 7:
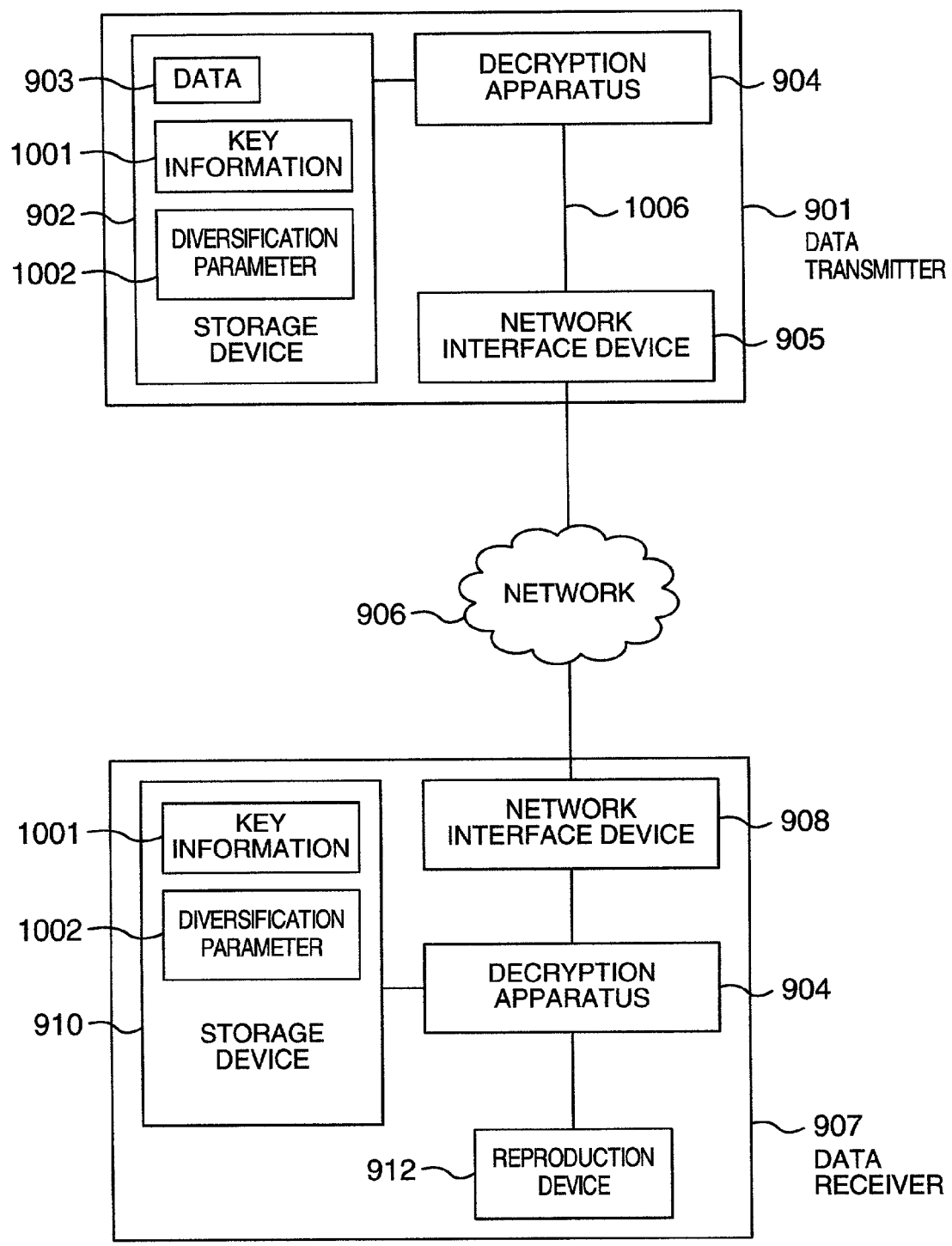
FIG. 7 is a schematic diagram of a data delivery system to which the pseudorandom number generating apparatus in the embodiment has been applied.
Figure 8:
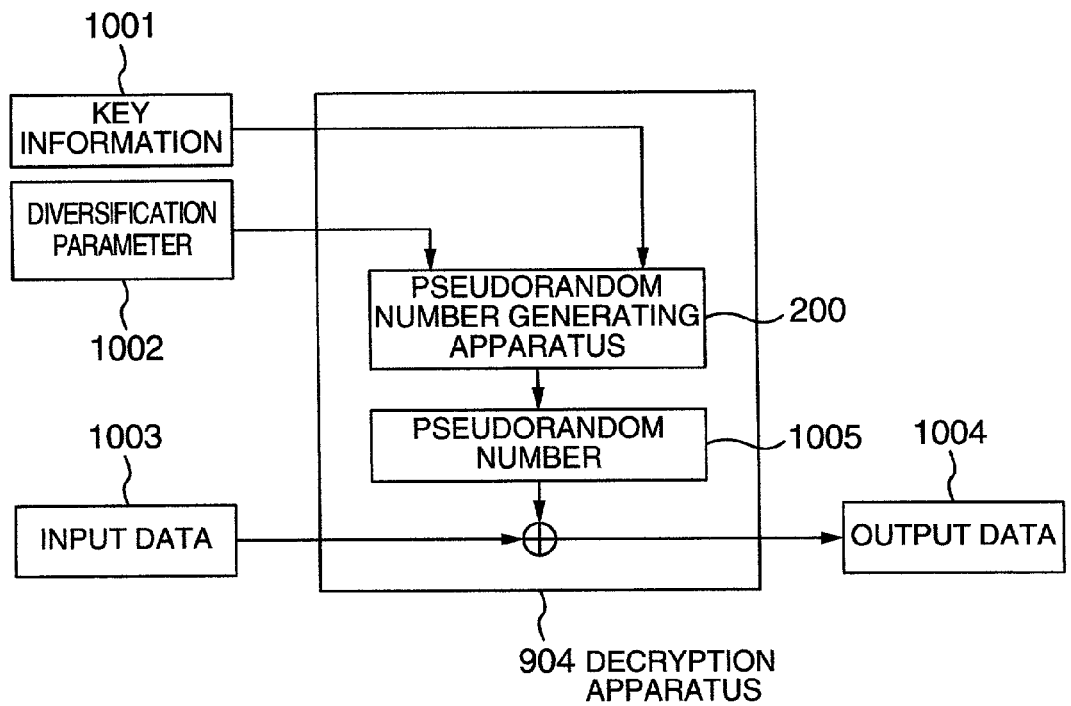
FIG. 8 is a schematic diagram of a decryption apparatus in a data transmitter to which the embodiment has been applied.

FIG. 7 is a schematic diagram of a device used in the present embodiment. FIG. 8 shows such an example that a decryption apparatus (904) included in a data transmitter (901) and a data receiver (907) of FIG. 7 is formed by using a pseudorandom number generating apparatus of the present embodiment.

Data delivery is conducted in the following steps.

Step 1: A data transmitting person and a data receiving person previously share key information (1001) in secrecy so as to be able to share the same random number sequence. An initial vector or diversification parameter (1002) is also shared although it need not be in secrecy. For sharing these kinds of information, for example, a key delivery method using the public key cryptosystem can be used.

Step 2: The data transmitting person encrypts plaintext data (903) by using a decryption apparatus (904) supplied with the shared information. Operation of the decryption apparatus (904) will now be described by referring to FIG. 8.

The decryption apparatus (904) generates a pseudorandom number sequence (1005) having the same length as that of input (1003) (which is the plaintext data (903) in this case). Generation of the pseudorandom number sequence is conducted by supplying the key information (1001), the initial vector or diversification parameter (1002), and the number of times of outputting to the pseudorandom number generating apparatus (200) according to the present embodiment. By conducting an exclusive OR-ing operation on the generated pseudorandom number sequence (1005) and the data (903), ciphertext data (1006) is calculated and output as an output (1004).

Step 3: The data transmitting person transmits the ciphertext data (1006) to the data receiving person via a network (906) by using a network interface device (905).

Step 4: The data receiving person decrypts the ciphertext data (1006) received via a network interface device (908), by using the decryption apparatus (904) supplied with the shared information. Operation of the decryption apparatus (904) will now be described by referring to FIG. 8.

The decryption apparatus (904) generates the pseudorandom number sequence (1005) having the same length as that of the input (1003) (which is the ciphertext data (1006) in this case) in the same way as the operation conducted at the time of encryption. By conducting an exclusive OR-ing operation on the generated pseudorandom number sequence (1005) and the ciphertext data (1006), decrypted data, i.e., plaintext data (1011) is calculated and output as the output (1004).

Step 5: The data receiving person reproduces the decrypted plaintext data in a reproduction device (912).

It will be possible to provide a pseudorandom number generation technique that does not increase an implementation cost in both software and hardware, that is practical, and that can operate at high speed. The specification and the drawings are, accordingly, to be regarded in an illustrative rather than a restrictive sense. It will, however, be evident that various modifications and changes may be made thereto without departing from the broader spirit and scope of the invention as set forth in the claims.

We claim:

1. An encryption apparatus comprising:
a pseudorandom number generating apparatus for generating a pseudorandom number sequence having a length equal to that of plaintext data to be encrypted; and
an operation section for conducting an exclusive OR-ing operation on the generated pseudorandom number sequence and the plaintext data, thereby calculating ciphertext data and outputting the ciphertext data,
wherein said pseudorandom number generating apparatus comprises:
a state storage section,
a buffer,
a state transformation section for conducting transformation using a storage content of said buffer and a storage content of said state storage section and outputting a result of the transformation,
a state storage control section for updating an internal state of said state storage section by using the output of said state transformation section according to a clock, and
a buffer control section for updating an internal state of said buffer by using an output of a buffer transformation section,
wherein said state storage section has a capacity of 3 blocks (where one block has n bits), and said buffer has a capacity of a plurality of blocks, and
wherein said state transformation section comprises:
a nonlinear transformation section that uses the storage content of said buffer and the storage content of said state storage section as inputs, and
an output section for outputting one block data included in said result of the transformation as a partial random number sequence.

2. A decryption apparatus comprising:
a pseudorandom number generating apparatus for generating a pseudorandom number sequence having a length equal to that of ciphertext data, by using information for determining a random number sequence used when generating the ciphertext data to be decrypted; and
an operation section for conducting exclusive OR-ing operation on the generated pseudorandom number sequence and the ciphertext data, and thereby calculating plaintext data, and outputting the plaintext data,
wherein said pseudorandom number generating apparatus comprises:
a state storage section,
a buffer,
a state transformation section for conducting transformation using a storage content of said buffer and a storage content of said state storage section and outputting a result of the transformation
a state storage control section for updating an internal state of said state storage section by using the output of said state transformation section according to a clock, and
a buffer control section for updating an internal state of said buffer by using an output of a buffer transformation section,
wherein said state storage section has a capacity of 3 blocks (where one block has n bits), and said buffer has a capacity of a plurality of blocks, and
wherein said state transformation section comprises:
a nonlinear transformation section that uses the storage content of said buffer and the storage content of said state storage section as inputs, and
an output section for outputting one block data included in said result of the transformation as a partial random number sequence.

* * * * *